| United States Patent [19] | [11] | 4,020,216 |
|---|---|---|
| Miller | [45] | Apr. 26, 1977 |

[54] COATING COMPOSITION FOR FLEXIBLE SUBSTRATES

[75] Inventor: Lester I. Miller, Troy, Mich.

[73] Assignee: E. I. Du Pont de Nemours and Company, Wilmington, Del.

[22] Filed: June 3, 1975

[21] Appl. No.: 583,453

[52] U.S. Cl. .................................. 428/425; 260/16; 260/17 R; 260/22 TN; 260/23 P; 260/23 TN; 260/30.8 R; 260/31.2 XA; 260/31.4 R; 260/32.4; 260/32.8 N; 260/33.2 R; 260/33.4 UR; 260/33.6 UB; 260/33.6 UA; 260/37 N; 260/45.95 F; 428/521; 428/522

[51] Int. Cl.² ................... B32B 27/40; C08K 5/05; C08K 1/14

[58] Field of Search .............. 260/16, 17 R, 22 TN, 260/31.2 A, 31.2 N, 31.2 XA, 31.4 R, 32.4, 32.8 N, 33.2 R, 33.4 UR, 33.6 UB, 33.6 UA, 30.8 R; 428/425

[56] References Cited

UNITED STATES PATENTS

| 3,753,935 | 8/1973 | Miller | 260/22 |
|---|---|---|---|
| 3,789,037 | 6/1974 | Miller | 260/16 |
| 3,829,397 | 8/1974 | Sheppard | 260/31.8 |
| 3,841,895 | 10/1974 | Hicks | 260/17 R |
| 3,844,993 | 10/1974 | Miller | 260/17 R |
| 3,878,140 | 4/1975 | Sheppard | 260/17 R |
| 3,884,852 | 5/1975 | Sheppard | 260/17 R |
| 3,893,960 | 7/1975 | Sheppard | 260/17 R |

*Primary Examiner*—J. Ziegler

[57] ABSTRACT

A coating composition for flexible hydrocarbon rubber substrates or polyvinyl chloride substrates of
  A. an acrylic polymer containing hydroxy groups and other adhesion promoting groups,
  B. a hydroxy terminated ester or polyester, and
  C. an organic polyisocyanate;
the composition is useful as an original finish and as repair finish for repairing damaged finishes on flexible substrates, such as flexible filler panels located between the bumper and chassis of trucks and automobiles.

16 Claims, No Drawings

COATING COMPOSITION FOR FLEXIBLE SUBSTRATES

BACKGROUND OF THE INVENTION

This invention relates to a coating composition for flexible substrates and in particular to a coating composition that is used to repair finishes on flexible substrates.

The automotive and truck manufacturing industry now is utilizing bumpers of flexible material, flexible filler panels located between the bumper and the chassis, flexible exterior trim parts such as side moldings and other energy and impact absorbing parts to reduce damage in the event of a minor impact or a collision. These parts are coated with finishes that have excellent adherence to the substrate, are flexible and are highly durable. Hick, U.S. Pat. No. 3,841,895 issued Oct. 15, 1974, shows these types of finishes. Repair of these flexible finishes has been particularly troublesome since a repair paint must have good adhesion to the flexible substrate and to the flexible finish and must dry and cure rapidly to a high quality finish which is durable, weatherable, and flexible. Sheppard, U.S. Pat. No. 3,829,397, issued Aug. 13, 1974, is directed to such a repair finish and while it is of high quality for most uses, the flexibility of the resulting finish requires improvement. Conventional repair finishes designed for rigid substrates are shown in Miller, U.S. Pat. No. 3,789,037, issued Jan. 29, 1974; Miller, U.S. Pat. No. 3,844,993, issued Oct. 29, 1974; and Miller, U.S. Pat. No. 3,753,935, issued Aug. 21, 1973; but are not acceptable for repairing finishes on flexible substrates due to inadequate flexibility of the resulting finish.

SUMMARY OF THE INVENTION

The coating composition of this invention comprises 5–60% by weight of a film forming binder and 40–95% by weight of an organic solvent for the binder; wherein the binder consists essentially of about A. 20–90% by weight of an acrylic polymer containing hydroxyl groups and other adhesion promoting groups or a mixture of acrylic polymers each containing adhesion promoting groups and the acrylic polymer has a weight average molecular weight of about 5,000–80,000 determined by gel permeation chromatography;

B. 5–40% by weight of a hydroxy terminated ester or a hydroxy terminated polyester; and C. 5–75% by weight of an organic polyisocyanate; wherein a dried film about 2 mils thick of the composition on a flexible hydrocarbon rubber substrate can withstand a 360° mandrel bend test at 5° C. without cracking of the film or loss of adhesion of the film to the substrate.

DESCRIPTION OF THE INVENTION

The coating composition is used to repair finishes on all types of flexible substrates used on automobiles and trucks and the resulting finish has excellent adhesion to these substrates, good flexibility, weatherability and durability. The composition after application can be dried at ambient temperatures to a tack-free finish in about 30–100 minutes and is essentially fully cured in about 24 hours. The finish can be baked at low temperatures, such as 50°–140° C. for about 5 to 10 minutes, to enhance drying and curing of the finish.

The coating composition of this invention contains about 5–60% by weight of the film-forming binder and about 95–40% by weight of an organic solvent for the binder. The composition can contain a 0.1–50% by weight pigment, but can be unpigmented and utilized as a clear composition.

In determining the flexibility of the composition by the mandrel bend test, a film of the composition is sprayed onto a sanded or roughened flexible hydrocarbon rubber substrate and dried for about 24 hours at 25° C. or for about 20 minutes at 65° C. to give a film on the substrate about 2 mils thick. The resulted coated substrate is cooled to about 5° C. and then the coated substrate is bent 360° over a one-inch steel mandrel with the rubber substrate being the side that is placed next to the mandrel. The film them is examined for cracking and loss of adhesion of the film to the substrate. If no cracking, chipping, flaking, or loss of adhesion is noted, the composition passed the test and is acceptable. Even if only slight cracking or loss of adhesion is noted, the composition is not acceptable.

The acrylic polymer used in the coating composition contains hydroxyl groups and other adhesion promoting groups, such as carboxyl groups, groups from primary, secondary, or tertiary amines, oxazoline ester groups, and the like.

The acrylic polymer has a weight average molecular weight of about 5,000–80,000, but usually has a weight average molecular weight of about 15,000–40,000. The molecular weight is determined by gel permeation chromatography.

Other acrylic polymers which are useful in the composition have a relative viscosity of about 1.03 to 1.30 measured at 25° C. on a 0.5% polymer solids solution using dichloroethylene as the solvent.

These acrylic polymers are prepared by conventional polymerization techniques in which the monomers, solvents, and polymerization catalysts are charged into a reaction vessel and the reaction mixture is heated to about 50°–200° C. and reacted from about 1 to 6 hours to form a polymer having the aformentioned viscosity range.

The following are typical of polymerization catalysts which can be used to prepare these acrylic polymers such as azo, bis-isobutyronitrile, azo-bis-($\alpha,\gamma$-dimethylvaleronitrile), benzoyl peroxide, t-butylperoxypivalate, di-tertiary-butyl peroxide and the like.

The following are typically useful solvents that can be used to prepare the acrylic polymers or can be subsequently used to dilute the polymer composition in the preparation of a coating composition: acetone, 2-nitro propane, methyl ethyl ketone, amyl alcohol, ethylene glycol monoethyl ether acetate, ethyl acetate, ethyl alchohol, isopropanol, ethylene dichloride, diacetone alcohol, diisobutyl ketone, cyclohexanone, amyl acetate, ethylene glycol monobutyl ether, furfural, petroleum naphtha, toluene, xylene, substituted benzene, benzene, substituted toluene, hexane, aromatic hydrocarbons, high boiling petroleum naphthas, high solvency petroleum hydrocarbons, diethyl ether, methyl amyl acetate, butanol and the like.

One acrylic polymer useful in this invention is of 20–40% by weight of methyl methacrylate, 40–74% by weight of an alkyl methacrylate having 2–12 carbon atoms in the alkyl group or an alkyl acrylate having 1–12 carbon atoms in the alkyl group or a mixture of these acrylates and methacrylates, 5–15% by weight of a hydroxyalkyl methacrylate or a hydroxyalkyl acrylate each having 2-4 carbon atoms in the alkyl group or a mixture thereof, and 1-15% by weight of an alkyl amino alkyl methacrylate or acrylate.

Typical alkyl acrylates or alkyl methacrylates that can be utilized in preparing this copolymer are ethyl acrylate, propyl acrylate, butyl acrylate, isobutyl acrylate, hexyl acrylate, 2 ethylhexyl acrylate, nonyl acrylate, pentyl acrylate, lauryl acrylate, ethyl methacrylate, propyl methacrylate, butyl methacrylate, isobutyl methacrylate, hexyl methacrylate, 2 ethylhexyl methacrylate, octylmethacrylate, nonyl methacrylate, pentyl methacrylate and lauryl methacrylate.

Typical hydroxy alkyl acrylates and methacrylates that can be used to prepare this acrylic polymer are hydroxy ethylacrylate, hydroxy propylacrylate, hydroxy butylacrylate, hydroxy ethylmethyacrylate, hydroxy propylmethyacrylate, and hydroxy Typical alkyl amino alkyl methacrylates and acrylates that are used are of the formula

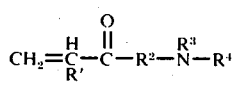

where $R^1$ is either hydrogen or methyl, $R^2$ is an aliphatic hydrocarbon group having 1-6 carbon atoms, $R^3$ and $R^4$ are either hydrogen or an aliphatic saturated hydrocarbon group having 1-6 carbon atoms.

Typical compounds are as follows: dimethyl amino ethyl methacrylate, diethyl amino ethyl methacrylate, dipropyl amino ethyl methacrylate, methyl ethyl amino ethyl methacrylate, butyl amino ethyl methacrylate, tertiary butyl amino ethyl methacrylate, diethyl amino propyl methacrylate, diethyl amino butyl methacrylate, diethyl amino pentyl methacrylate, diethyl amino hexyl methacrylate, dimethyl amino ethyl acrylate, methyl ethyl amino ethyl acrylate, and the like. Diethylamino ethyl methacrylate and tertiary butyl amino ethyl methacrylate are preferred since these compounds provide finishes with excellent adhesion.

Optionally, about 0.1-5% by weight of an ethylenically unsaturated carboxylic acid can be used in the aforementioned acrylic polymer. Typically useful acids are acrylic acid, methacrylic acid, itaconic acid, maleic acid, itaconic acid, ethacrylic acid and the like. Either methacrylic acid or acrylic acid is usually used.

One preferred acrylic polymer which gives a high quality finish that has good adhesion is of methyl methacrylate, butyl acrylate, hydroxy ethylacrylate, and tertiary butyl amino ethyl methacrylate.

Another useful acrylic polymer is of 20-44% by weight of methyl methacrylate, 50-70% by weight of an alkyl acrylate having 2-12 carbon atoms in the alkyl group or an alkyl methacrylate having 6-12 carbon atoms in the alkyl group, or a mixture of these acrylates and methacrylates, 5-20% by weight of a hydroxy alkyl acrylate or methacrylate or a mixture thereof each having 2-4 carbon atoms in the alkyl group and 1-20% by weight of an α,β ethylenically unsaturated carboxylic acid.

Any of the aforementioned alkyl acrylates and methacrylates, hydroxy alkyl acrylates and methacrylates and acids can be used to prepare the above acrylic polymer.

One acrylic polymer which has good adhesion and flexibility of the above type is of methyl methacrylate, butyl acrylate, hydroxyethyl acrylate and acrylic acid.

Generally, the coating composition is pigmented. The pigments are introduced into the coating composition by first forming a mill base with a compatible dispersing resin, such as one of the aforementioned acrylic polymers, by conventional sand grinding, attritor grinding, or ball mill techniques, and then the mill base is blended with the film-forming binder as shown in the Examples.

The following are examples of the great variety of pigments which are used in the coating composition: metallic oxides, preferably titanium dioxide, zinc oxide, and the like, metal hydroxides, metal flakes, such as aluminum flake, bronze flake, "Afflair" pigments, i.e., mica-coated with titanium dioxide, metal powders, chromates, such as lead chromate, sulfides, sulfates, carbonates, carbon black, silica, talc, china clay, iron blues, organic reds, organic maroons, and other organic pigments.

One useful dispersing resin is an acrylic vinyl oxazoline ester polymer of 40-70% by weight of methyl methacrylate, 5-25% by weight of an alkyl methacrylate having 2-12 carbon atoms in the alkyl group or an alkyl acrylate having 1-12 carbon atoms in the alkyl group or a mixture of these methacrylates and acrylates, 1-10% by weight of acrylonitrile and 15-35% by weight of a vinyl oxazoline ester of drying oil fatty acids.

Any of the aforementioned alkyl acrylates and alkyl methacrylates can be used to prepare this polymer.

The oxazoline ester used in the polymer is polymerized into the polymer backbone and is of the following formula:

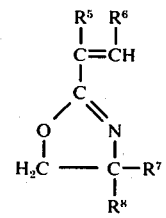

wherein
$R^5$ is a hydrocarbon group having 2-20 carbon atoms,
$R^6$ is either hydrogen or an alkyl group having 1-14 carbon atoms,
$R^7$ and $R^8$ are either hydrogen or an alkyl group having 1-4 carbon atoms or

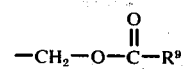

$R^9$ is a hydrocarbon group having 3-21 carbon atoms. Preferably, $R^5$ and $R^9$ are unsaturated aliphatic hydrocarbon groups which are form drying oil fatty acids and $R^6$ is hydrogen. Typical drying oil fatty acids that are used to prepare the above oxazoline esters are linseed oil fatty acids, tall oil fatty acids and dehydrated castor oil fatty acids.

The oxazoline esters can be made according to Purcell U.S. Pat. No. 3,248,397, issued Apr. 26, 1966. One preferred compound of this type is a reaction product of 1 mol of tris-(hyroxymethyl)-amino methane and 3 mols of tall oil fatty acids which is subsequently reacted with formaldehyde. This compound is currently sold under the trademark "Chemacoil TA-100".

One acrylic-vinyl oxazoline ester polymer is of methyl methacrylate, ethyl acrylate, acrylonitrile and a vinyl oxazoline ester of tall oil fatty acids.

In the resulting composition, when an acrylicvinyl oxazoline ester polymer is used as a dispersing resin, the acrylic polymer constituent of the composition is a mixture of about 1–50% by weight of an acrylic-vinyl oxazoline ester polymer and 50–99% by weight of one of the aforementioned acrylic polymers.

The hydroxy terminated ester used in the composition of this invention is an ester of a dicarboxylic acid and a polyol or an ester of a polyol and a hydroxy terminated monocarboxylic acid. One useful ester is of a bis primary diol of 2–22 carbon atoms and a hydroxy terminated monocarboxylic acid. One preferred ester which gives a high quality product is 2,2-dimethyl-1,3-hydroxy-propyl-2,2-dimethyl-1,3-hydroxypropionate.

A hydroxy terminated polyester can also be used which is the esterification product of a glycol or polyol and a dicarboxylic acid or a mixture of dicarboxylic acids or alkyl esters of dicarboxylic acids. In the latter, a polyester is formed by an ester interchange reaction. These polyesters have a wieght average molecular weight of about 300–6,000 determined by gel permeation chromatography.

Typical glycols and polyols that can be used to prepare these polyesters are ethylene glycol, propylene glycol, butanediol, neopentyl glycol, diethylene glycol, and the like.

Typical acids that can be used as oxalic acid, malonic acid, succinic acid, glutaric acid, adipic acid, pimelic acid, suberic acid, azelaic acid, sebacic acid, phthalic acid, isophthalic acid, terephthalic acid, and the like. Mixtures of these acids can also be used. Lower alkyl esters such as the methyl esters of these acids can be used.

One useful hydroxy terminated polyester is the esterification product of neopentyl glycol and mixed methyl esters of succinic acid, glutaric acid and adipic acid. This polyester has a weight average molecular weight of about 300–1,500.

The polyisocyanate used in this invention is preferably added to the other constituents of the coating composition and blended therewith only a short time before the composition is used. For best results, it is preferable to add the polyisocyanate in a solution. The polyisocyanate solution is of about 2–75% by weight of a polyisocyanate dissolved in a solvent or a blend of solvents for the polyisocyanate that are compatible with the coating composition. Any of the aforementioned solvents can be used.

Typical aliphatic polyisocyanates and cycloaliphatic diisocyanates that can be used are:
ethylene diisocyanate,
propylene-1,2-diisocyanate,
tetramethylene diisocyanate,
hexamethylene diisocyanate,
decamethylene diisocyanate,
cyclohexylene-1,2-diisocyanate,
methylene-bis-(4-cyclohexylisocyanate),
ethylene-bis-(4-cyclohexylisocyanate),
propylene-bis-(4-cyclohexylisocyanate), and the like.

The preferred polyisocyanate used in this invention has the formula:

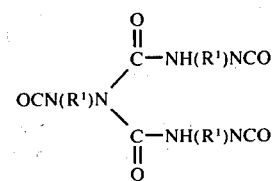

wherein $R^1$ is an alkyl group having 1–12 carbon atoms. One preferred polyisocyanate is the biuret of hexamethylene diisocyanate that has the above structural formula in which $R^1$ is a saturated straight chain hydrocarbon group having 6 carbon atoms. These biurets are prepared according to the process described in Mayer et al. U.S. Pat. No. 3,245,941, issued Apr. 12, 1966.

In addition to the above constituents of the filmforming binder, the composition can contain from about 0.5 to 15% by weight, based on the weight of the binder, of an alkyd resin. These alkyd resins are of the typical type which are the esterification product of a drying oil fatty acid, such as chinawood oil, linseed oil, soya oil, tall oil and dehydrated castor oil fatty acids, a polyhydric alcohol, a dicarboxylic acid or anhydride and an aromatic monocarboxylic acid.

Typical polyhydric alcohols that can be used to prepare the alkyd resin used in this invention are glycerine, pentaerythritol, trimethylol ethane, trimethylol propane, glycols, such as ethylene glycol, propylene glycol, butane diol, pentane diol and the like.

Typical dicarboxylic acids or anhydrides can be used to prepare the alkyd resin are phthalic acid, phthalic anhydride, isophthalic acid, terephthalic acid, maleic acid, fumaric acid, and the like. Typical monocarboxylic aromatic acids are benzoic acid, paratertiary butylbenzoic acid, phenol acetic acid, triethyl benzoic acid, and the like.

Optionally, plasticizers in amounts from about 0.5 to 20% by weight, based on the weight of binder, can be added in addition to the above constituents to the composition. Plasticizers that can be used are castor oil, blown castor oil, benzylbutyl phthalate, dibutyl phthalate, triphenyl phosphate, 2-ethylhexylbenzyl phthalate, dicyclohexyl phthalate, diallyl phthalate, dibenzyl phthalate, butylcyclohexyl phthalate, mixed benzoic acid and fatty oil acid esters of pentaerythritol, poly(-propyleneadipate)dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexyl ester of hexamethylene diphthalate, di(methylcyclohexyl)phthalate. One preferred plasticizer of this group is benzyl butyl phthalate, since it forms a coating with excellent balance of properties.

Small amounts of about 0.1–2.0%, based on the weight of the binder of conventional metallic driers can be used in the coating composition, such as lead naphthenate, manganese naphthenate, cobalt naphthenate, lead tallate, nickel salts, such as nickel octoate, alkyl tin dilurates such as dibutyl tin dilaurate and the like.

From about 0.1 to 1% by weight, based on the weight of the binder, in addition to the other binder constituents of ultraviolet light absorbers can be added to the coating composition. Typical ultraviolet light absorbers are substituted benzophenone derivatives, such as 2,4- dihydroxy benzophenone, a polymeric reaction product of orthohydroxybenzophenone/formaldehyde/phenol, dibenzoate of diphenylol propane, nonyl phenyl benzoate, 2,4-dihydroxyacetophenone, substituted benzotriazoles, such as 2-(2'-hydroxy-5'-methyl phenyl)benzotriazole, and the like.

Also in addition to the above binder constituents, about 0.5 to 10% by weight, based on the weight of the binder, of cellulose acetate butyrate can be used in the coating composition. The cellulose acetate butyrate generally has a butyryl content of about 30–55% by weight and a viscosity of 0.1–6 seconds determined at 25° C. according to ASTM-D-1343-56.

The coating compositions of this invention can be applied to a substrate by any of the usual application methods, such as spraying, electrostatic spraying, dipping, brushing, flow coating and the like. The viscosity of the composition can be adjusted for any of these methods by varying the solvents. These coatings can be air dried or baked at a relatively low temperature. The resulting coating is about 0.1–5 mils thick, preferably 1–3 mills thick, and has good gloss. The coating composition of the invention does not yellow noticeably on baking and gives a hard, flexible, durable, scratch-resistant, gasoline-resistant, weather-resistant, alkali-resistant, glossy coating which is suitable as a repair finish for flexible substrates used on automobile and truck bodies.

Typical examples of flexible substrates which are currently used on automobiles and trucks to which the coating composition can be applied are flexible hydrocarbon rubbers such as EPDM (terpolymers of ethylene, propylene and diene), butyl rubber, styrene-butadiene rubber, polybutadiene rubber, polyisoprene rubber, urethane rubbers, "Hytrel" rubbers, polyester rubbers, injection molded polyester urethane rubbers, elastoplastic microcellular urethane foams, ABS rubbers (terpolymers of acrylonitrile, butadiene and styrene). Also, the composition can be applied to polyvinyl chloride substrates. The coating composition can be used as a repair finish as well as an original finish. The composition can also be used as a finish over a variety of conventional substrates, such as wood, metals, such as aluminum and steel, polymer reinforced fiber glass, plastics, and the like.

The following Examples illustrate the invention. All quantities shown are on a weight basis unless otherwise indicated.

EXAMPLE 1

A clear composition is formed by thoroughly blending together the following constituents:

| | Parts by Weight |
|---|---|
| Ester Diol (2,2-dimethyl-1,3-hydroxy propyl-2,2-dimethyl-1,3-hydroxy proprionate) | 65.99 |
| Acrylic Polymer Solution (55% solids of a polymer of methyl methacrylate/butylacrylate/ hydroxyethylacrylate/tertiary butyl amino ethyl methacrylate in weight ratio of 28/60/ 10/2 and having a weight average molecular weight of about 28,000 determined by gel permeation chromatography and having a Gardner Holdt viscosity of about V-X and measured at 25° C. and the above solids in a solvent blend of toluene/butyl acetate/methyl ethylketone/xylene) | 329.62 |
| Blown Castor Oil | 15.35 |
| Dibutyl tin dilaurate solution (2.7% solids in ethyl acetate) | 52.18 |
| Butyl acetate | 108.19 |

-continued

| | Parts by Weight |
|---|---|
| Toluene | 112.08 |
| Methyl ethyl ketone | 79.80 |
| Silicone resin solution (.2% resin solids in xylene) | 3.07 |
| Total | 767.00 |

A cellulose acetate butyrate/acrylic polymer clear composition is prepared by thoroughly blending together the following constituents:

| | Parts by Weight |
|---|---|
| Porton 1 | |
| Acetone | 15.34 |
| Isopropanol | 12.94 |
| Toluene | 7.58 |
| Portion 2 | |
| Cellulose Acetate Butyrate (having a 38% butyryl content and a 2 second viscosity) | 13.45 |
| Portion 3 | |
| Silicone Resin Solution (described above) | 0.22 |
| Butyl cyclohexyl phthalate | 1.49 |
| Portion 4 | |
| Toluene | 4.43 |
| Acrylic-vinyl oxazoline ester polymer solution (48% polymer solids in organic solvent mixture of a polymer of methyl methacrylate/ethyl acrylate/acrylonitrile/vinyl oxazoline ester of tall oil fatty acids in a weight ratio of 55/15/5/25 and having a relative viscosity of 1.1199 measured at 25° C. on a 0.5% solids in dichloroethylene and having Gardner Holdt viscosity of about W measured at 25° C. and the above solids. | 25.22 |
| Acetone | 19.33 |
| Total | 100.00 |

Portion 1 is charged into a mixing vessel and mixed for five minutes. Portion 2 is slowly added and mixed until Portion 2 is dissolved. Portion 3 is then added and mixed for 30 minutes and then portion 4 is added and mixed for an additional 30 minutes.

A white mill base is prepared as follows:

| | Parts by Weight |
|---|---|
| Portion 1 | |
| White Acrylic Dispersion (67% solids of titanium dioxide pigment dispersed with an acrylic-vinyl oxazoline ester polymer described above, in organic solvents and having a pigment/binder ratio of 636/100) | 89.28 |
| Portion 2 | |
| Bentone Pigment Dispersion (25.7% solids of Bentone 34 pigment dispersed with an acrylic-vinyl oxazoline ester polymer described above in organic solvents and having a pigment to binder ratio of 45.2/100) | 166.46 |
| Methyl methacrylate/butyl acrylate copolymer solution (40% polymer solids in which the copolymer 82% methyl methacrylate and 18% butyl acrylate in an organic solvent mixture and having a Gardner Holdt viscosity at 25° C of W-Y) | 325.45 |
| Acrylic-vinyl oxazoline ester polymer solution (described above) | 142.90 |
| Toluene | 81.46 |
| Silicone resin solution (described above) | 1.89 |
| Portion 3 | |
| Toluene | 16.56 |
| Total | 824.00 |

Portion 1 is charged into a mixer and then the mixer is started and ingredients of portion 2 are added in the order shown and the mixing is continued for one hour and then portion 3 is added with mixing. The resulting mill base has a pigment to binder ratio of 22/100 where the binder is the film forming polymeric material in the mill base.

A maroon mill base is prepared as follows:

| | Parts by Weight |
|---|---|
| Portion 1 | |
| Red Pigment Dispersion (33.6% solids of thio fast red lake dispersed with the acrylic vinyl oxazoline ester polymer described above, in organic solvents having a pigment to binder ratio of about 50/100) | 530.85 |
| Portion 2 | |
| Acrylic-vinyl oxazoline ester polymer solution (described above) | 282.15 |
| Silicone resin solution (described above) | 2.00 |
| Total | 815.00 |

Portion 1 is charged into a mixer and the mixer is started and then portion 2 is added and mixed for one hour. The resulting mill base has a pigment to binder ratio of about 25/100.

An aluminum flake mill base is prepared as follows:

| | Parts by Weight |
|---|---|
| Portion 1 | |
| Acrylic-vinyl oxazoline ester polymer solution (described above) | 427.35 |
| Aluminum Flake Paste (65% medium particle size aluminum flake in mineral spirits) | 85.18 |
| Portion 2 | |
| Acrylic-vinyl oxazoline ester polymer solution (described above) | 228.51 |
| Toluene | 75.43 |
| Silicone resin solution (described above) | 2.22 |
| Portion 3 | |
| Toluene | 14.31 |
| Total | 833.00 |

Portion 1 is charged into a mixer and mixed for four hours. the constituents of portion 2 are added in the order shown and then mixed for one hour. Portion 3 is added with mixing. An aluminum flake mill base is formed having a pigment to binder ratio of 17.5/100.

A blue mill base is prepared as follows:

| | Parts by Weight |
|---|---|
| Portion 1 | |
| Blue pigment dispersion (33% solids of a copper phthalocyanine blue pigment dispersed with the above described acrylic-vinyl oxazoline ester polymer in an organic solvent mixture and having a pigment to binder ratio of about 58/100) | 674.68 |
| Portion 2 | |
| Acrylic-vinyl oxazoline ester polymer solution (described above) | 122.22 |
| Silicon resin solution (described above) | 1.77 |
| Portion 3 | |
| Toluene | 7.33 |
| Total | 806.00 |

Portion 1 is charged into a mixer and then the mixer is started and portion 2 is added and mixed one hour then portion 3 is added with mixing. The resulting mill base has pigment to binder ratio of about 40/100.

A black mill base is prepared as follows:

| | Parts by Weight |
|---|---|
| Portion 1 | |
| Black Pigment Dispersion (31% solids of a peptized carbon black pigment dispersed with the above acrylic vinyl oxazoline ester polymer in an organic solvent mixture and having a pigment to binder ratio of about 30/100) | 418.26 |
| Portion 2 | |
| Bentone Pigment Dispersion (described above) | 124.89 |
| Acrylic-vinyl oxazoline ester polymer solution (described above) | 247.15 |
| Silicon resin solution (described above) | 2.70 |
| Total | 793.00 |

Portion 1 is charged into a mixer and the mixer is started and then portion 2 is added and mixed one hour. The resulting mill base has a pigment to binder ratio of about 12/100.

A composite mill base is prepared as follows:

| | Parts by Weight |
|---|---|
| Black mill base (prepared above) | 4.0 |
| White mill base (prepared above) | 7.0 |
| Maroon mill base (prepared above) | 19.0 |
| Blue mill base (prepared above) | 39.0 |
| Aluminum flake mill base (prepared above) | 139.0 |
| Total | 208.0 |

The above mill bases are thoroughly blended together to form a composite mill base.

A pigmented coating composition is prepared by thoroughly blending together the following:

| | Parts by Weight |
|---|---|
| Composite mill base (prepared above) | 208.0 |
| Clear composition (prepared above) | 790.0 |
| Cellulose Acetate Butyrate/Acrylic Polymer Clear composition (prepared above) | 858.0 |
| Total | 1856.0 |

A pigmented acrylic enamel is prepared by blending together the following:

| | Parts by Weight |
|---|---|
| Pigmented coating composition (prepared above) | 214.5 |
| Isocyanate Solution (43.8% solids of the biuret of hexamethylene diisocyanate in ethyl acetate) | 54.0 |
| Total | 268.5 |

The above enamel is reduced to a spray viscosity of a No. 2 cup Zahn viscosity of 25–35 seconds using the following solvent mixture: acetone/methanol/isopropanol/ethylene glycol monoethyl ether acetate/toluene in a weight ratio of 10/3/12/2.6/66.4.

The enamel is then sprayed onto flexible "Nordel" rubber panels primed with an acrylic polymer crosslinked with an alkylated melamine formaldehyde resin and top coated with a flexible acrylic enamel. The top coat is lightly sanded before the enamel is applied. The resulting finish is dried for 24 hours at about 25° C. giving a 2-mil thick finish that is tacky-free and has a good appearance and good gloss. The finish has excellent flexibility as shown by the mandrel bend test in which the finish did not crack, chip, or peel. In the mandrel bend test, the panel is bent around a one-inch mandrel with the unfinished side of the panel placed next to the mandrel. During the test, the panel is at 5° C. The finish has excellent weatherability and retained its flexibility even after outdoor exposure.

EXAMPLE 2

A pigmented coating composition is prepared by thoroughly blending together the following:

|  | Parts by Weight |
|---|---|
| Composite mill base (prepared in Example 1) | 208.0 |
| Clear composition (prepared in Example 1) | 858.0 |
| Total | 1066.0 |

A pigmented acrylic enamel is prepared by blending 75 parts by volume of the above prepared pigmented coating composition with a 25% by volume of the isocyanate solution described in Example 1. The enamel is then reduced to a spray viscosity of a No. 2 cup Zahn viscosity of 25–35 seconds using the solvent mixture described in Example 1.

The enamel is then sprayed onto flexible Nordel rubber panels, primed and coated as in Example 1. Then the panels are lightly sanded before the enamel is applied. After application, the resulting finish is dried for 24 hours giving about a 2-mil thick finish that has good appearance and good gloss. The finish has excellent flexibility, as shown by the mandrel bend test conducted at 5° C., which test is described in Example 1. The gloss measured at a 20° angle is 78 and at a 10° angle is 90 measured with a standard gloss meter, the knoop hardness is 0.74 and the adhesion to the sanded portion of the enamel substrate is excellent.

EXAMPLE 3

A composite mill base is prepared as follows:

|  | Parts by Weight |
|---|---|
| Black mill base (prepared in Example 1) | 7.0 |
| White mill base (prepared in Example 1) | 15.0 |
| Maroon mill base (prepared in Example 1) | 37.0 |
| Blue mill base (prepared in Example 1) | 78.0 |
| Aluminum flake mill base (prepared in Example 1) | 278.0 |
| Total | 415.0 |

The above mill bases are thoroughly blended together to form a composite mill base.

The dryer solution is prepared by blending together the following ingredients:

|  | Parts by Weight |
|---|---|
| Silicone resin solution (0.2% resin in xylene) | 0.95 |
| Cobalt naphthenate solution (containing 6% cobalt based on cobalt naphthenate in a hydrocarbon solvent) | 57.50 |
| Manganese naphthenate solution (containing 6% manganese based on manganese naphthenate in a hydrocarbon solvent) | |
| Zirconium dryer catalyst (28% solids of the zirconium organic complex in mineral spirits containing 6% zirconium metal) | 34.88 |
| Butyl acetate | 32.27 |
| Toluene | 10.72 |
| Mineral Spirits | 9.84 |
| VM & P Naphtha | 44.00 |
| Xylene | 3.17 |
| Total | 200.00 |

A pigmented acrylic enamel is prepared by blending together the following:

|  | Parts by Weight |
|---|---|
| Composite in mill base (prepared above) | 83.0 |
| Dryer solution (prepared above) | 10.0 |
| Ester diol (50% solution of 2,2-dimethyl-1,3-hydroxypropyl-2,2-dimethyl-1,3-hydroxypropionate in 2/1 acetone toluene solvent mixture) | 69.5 |
| Acrylic resin solution (47.4% solids of an acrylic polymer of methyl methylmethacrylate/butylacrylate/hydroxyethylacrylate/acrylic acid in a weight ratio of 26.4/60.6/10.0/3.0 having an acid number of 23 to 25 and having a relative viscosity of about 1.135 measured at 25° C. on a 0.5% solids in solution dichloroethylene and a Gardner Holdt viscosity measured at 25° C. and the above solids of Y-Z in a hydro carbon solvent) | 50.0 |
| Alkyd resin solution (55% solids in xylene of an alkyd resin of tung oil/ester of dehydrated castor oil fatty acids and pentaerythritol/ester of benzoic acid and pentaerythritol/ester of phthalic anhydride and pentaerythritol and excess pentaerythritol in a weight ratio of 4.6/41.2/10.0/37.7/6.5 and having a weight average molecular weight of about 4,000–5,000 measured by gel permeation chromatography and having a Gardner Holdt viscosity measured at 25° C. of X-Z measured at the above solids) | 9.1 |
| Butyl Acetate | 10.0 |
| Isocyanate Solution (described in Example 1) | 59.5 |
| Total | 281.1 |

The above enamel is reduced to a spray viscosity, as in Example 1, using the same solvent mixture and then the enamel is sprayed onto flexible (Nordel) rubber panels primed and topcoated as in Example 1. The topcoat is lightly sanded before the enamel is applied. The resulting finish is dried for about 24 hours giving a 2-mil finish that has a good appearance and good gloss, and the finish has excellent flexibility, as shown by the mandrel bend test described in Example 1.

EXAMPLE 4

A clear composition is prepared by blending together the following ingredients:

|  | Parts by Weight |
|---|---|
| Polyester resin (polyester prepared from 2 moles of neopentyl glycol and 2 moles of mixed methyl esters of succinic acid, glutaric acid and adipic acid having a Gardner Holdt viscosity of X + ½ measured at the above solids at 25° C. and having a hydroxyl number of 443 and a weight average molecular weight of about 300–1,000 determined by gel permeation chromatography) | 16.10 |

-continued

| | Parts by Weight |
|---|---|
| Acrylic resin solution (described in Example 3) | 33.44 |
| Dibutyltindilaurate solution (2.7% solids in pentane dione) | 5.00 |
| Butyl Acetate | 14.00 |
| Toluene | 5.37 |
| Xylene | 11.90 |
| VM & P Naphtha | 5.50 |
| Ethylene glycol | 2.00 |
| Alkyd resin solution (described in Example 3) | 6.69 |
| Total | 100.00 |

A coating composition is prepared by blending the following ingredients:

| | Parts by Weight |
|---|---|
| Composite mill base (prepared in Example 1) | 76.0 |
| Clear composition (prepared above) | 197.7 |
| Isocyanate solution (prepared in Example 1) | 87.5 |
| Total | 361.2 |

The above enamel is reduced to spray viscosity as in Example 1 using the same solvent mixture and then the enamel is sprayed onto flexible (Nordel) panel primed with an acrylic polymer crosslinked with an alkylated melamine resin and topcoated with a flexible acrylic enamel. The topcoat is slightly sanded before the enamel is applied. The resulting finish is dried for about 24 hours giving a 2-mil thick finish that is tack-free and has good appearance and good gloss. The finish has excellent flexibility, as shown by the mandrel bend test described in Example 1 and is expected to have excellent weatherability and is expected to retain its flexibility even after extended outdoor exposure.

I claim:

1. A coating composition comprising 5-60% by weight of a film-forming binder and 40-95% by weight of an organic solvent for the binder; wherein the binder consists essentially of about
   A. 20-90% by weight of an acrylic polymer containing hydroxyl groups selected from the group of an acrylic polymer consisting essentially of 20-40% by weight of methyl methacrylate, 40-74% by weight of an alkyl methacrylate having 2-12 carbon atoms in the alkyl group or an alkyl acrylate having 1-12 carbon atoms in the alkyl group, 5-15% by weight of a hydroxy alkyl methacrylate or a hydroxy alkyl acrylate each having 2-4 carbon atoms in the alkyl group and 1-5% by weight of an alkyl amino alkyl methacrylate or an alkyl amino alkyl acrylate and an acrylic polymer consists essentially of 20-44% by weight of methyl methacrylate, 50-70% by weight of an alkyl methacrylate having 6-12 carbon atoms in the alkyl group or an alkyl acrylate having 2-12 carbon atoms in the alkyl group, 5-20% by weight of a hydroxy alkyl acrylate or a hydroxy alkyl methacrylate or a mixture thereof of each having 2-4 carbon atoms in the alkyl group and 1-20% by weight of an $\alpha,\beta$ ethylenically unsaturated carboxylic acid; wherein the acrylic polymer has a weight average molecular weight of about 5,000-80,000 determined by gel permeation chromatography;
   B. 5-40% by weight of a hydroxy terminated ester of a bis primary diol of 2-22 carbon atoms and a hydroxy terminated mono carboxylic acid or a hydroxy terminated polyester of the esterification product of neopentyl glycol and mixed methyl esters of succinic acid, glutaric acid and adipic acid; and
   C. 5-75% by weight of an organic aliphatic or cycloaliphatic polyisocyanate;
   wherein a dried film of about 2 mils thick of the composition on a flexible hydrocarbon rubber substrate can withstand a 360° mandrel bend test at 5° C. without cracking of the film or loss of adhesion of the film to the substrate.

2. The coating composition of claim 1 containing in addition about 0.1-50% by weight, based on the weight of the binder, of pigments.

3. The coating composition of claim 1 containing in addition about 0.5-20% by weight, based on the weight of the binder, of an organic plasticizer.

4. The coating composition of claim 1 containing in addition about 0.5-10% by weight, based on the weight of the binder, of cellulose acetate butyrate having a viscosity of 0.1-6 seconds and a butyryl content of about 30-55%.

5. The coating composition of claim 1 in which the acrylic polymer consists essentially of methyl methacrylate, butyl acrylate, hydroxy ethyl acrylate and tertiary butyl amino ethyl methacrylate.

6. The coating composition of claim 1 in which the acrylic polymer consists essentially of methyl methacrylate, butyl acrylate, hydroxy ethyl acrylate and acrylic acid.

7. The coating composition of claim 1 in which a mixture of acrylic polymers is used consisting essentially of about 1-50% by weight of an acrylic vinyl oxazoline ester polymer and 50-99% by weight of one of the acrylic polymers containing hydroxyl groups wherein the acrylic vinyl oxazoline ester polymer consists essentially of 40-70% by weight of methyl methacrylate, 5-25% by weight of an alkyl methacrylate having 2-12 carbon atoms in the alkyl group or an alkyl acrylate having 1-12 carbon atoms in the alkyl group, 1-10% by weight of acrylonitrile, and 15-35% by weight of a vinyl oxazoline ester of dry oil fatty acids.

8. The coating composition of claim 7 in which the acrylic vinyl oxazoline ester consists essentially of methyl methacrylate, ethyl acrylate, acrylonitrile and vinyl oxazoline ester of tall oil fatty acids.

9. The coating composition of claim 1 in which the hydroxy terminated ester is an ester of 2,2-dimethyl-1,3-hydroxy-propyl-2,2-dimethyl-1,3-hydroxy propionate.

10. The coating composition of claim 1 in which the organic polyisocyanate is the biuret of hexamethylene diisocyanate.

11. The coating composition of claim 7 in which
   A. the acrylic polymer mixture is of
      1. an acrylic polymer consisting essentially of 20-40% by weight of methyl methacrylate, 40-74% by weight of butyl acrylate, 5-15% by weight of hydroxy ethyl acrylate and 1-15% by weight of tertiary butyl amino methacrylate, and
      2. an acrylic-vinyl oxazoline ester polymer consisting essentially of 40-70% by weight of methyl methacrylate, 5-25% by weight of ethyl acrylate, 1-10% by weight of acrylonitrile, and 15-35% by weight of a vinyl oxazoline ester of tall oil fatty acids;
B. the hydroxy terminated ester is 2,2-dimethyl-1,3-hydroxy propyl-2,2-dimethyl-1,3-hydroxy proprionate; and
C. the organic polyisocyanate is the biruet of hexamethylene diisocyanate.

12. The coating composition of claim 1 in which
A. the acrylic polymer consists essentially of 20-44% by weight of methyl methacrylate, 50-70% by weight of butyl acrylate, 5-20% by weight of hydroxy ethyl acrylate and 1-20% by weight of acrylic acid;
B. the hydroxy terminated ester is 2,2-dimethyl-1,3-hydroxy propyl-2,2-dimethyl-1,3-hydroxy proprionate; and
C. the organic polyisocyanate is the biuret of hexamethylene diisocyanate.

13. The coating composition of claim 1 in which
A. the acrylic polymer consists essentially of 20-44% by weight of methyl methacrylate, 50-70% by weight of butyl acrylate, 5-20% by weight of hydroxy ethyl acrylate, and 1-20% by weight of acrylic acid;
B. the hydroxy terminated polyester is the esterification product of neopentyl glycol and mixed methyl esters of succinic acid, glutaric acid and adipic acid; and
C. the organic polyisocyanate is the biruet of hexamethylene diisocyanate.

14. The coating composition of claim 1 containing 0.1-2% by weight, based on the weight of the binder, of an organo metal drier.

15. The coating composition of claim 1 containing 0.1-1% by weight of an ultraviolet light absorbing agent.

16. A flexible hydrocarbon rubber or polyvinyl chloride substrate coated with a dried coalesced layer of the composition of claim 1.

* * * * *